United States Patent Office 2,756,260
Patented July 24, 1956

2,756,260

METHOD OF MAKING TRICHLOROPHENOL MIXTURES WHICH ARE RICH IN THE 2,4,5-ISOMER

Alexander H. Widiger, Jr., Midland, Mich., assignor to The Dow Chemical Company, Midland, Mich., a corporation of Delaware No Drawing. Application August 14, 1952,
Serial No. 304,437

2 Claims. (Cl. 260—623)

This invention concerns a method of making mixtures of polychlorophenols, especially trichlorophenols, which are rich in 2,4,5-trichlorophenol and are useful as intermediates for the manufacture of herbicides.

It is known that 2,4,5-trichlorophenol may be used to make 2,4,5-trichlorophenoxyacetates and that the latter are useful as herbicides and are exceptionally effective in killing certain plants such as poison ivy, blackberries, and raspberries, etc. In contrast, isomers thereof, i. e. 2,3,4-trichlorophenoxyacetates, have been reported to possess relatively low herbicidal activities.

However, the known methods of making 2,4,5-trichlorophenol are inconvenient and costly or involve use of difficultly obtainable starting materials which are not available in large quantities. It has been made by chlorinating 2,5-dichlorophenol, but the latter is, itself, an expensive compound not available in large quantities. The 2,4,5-trichlorophenol is usually prepared by chlorinating benzene to obtain 1,2,4,5-tetrachlorobenzene and heating the latter with a mixture of methyl alcohol and sodium hydroxide in an autoclave. The latter method uses readily available starting materials, but is inconvenient and produces the compound in a low overall yield.

It is an object of this invention to provide a method whereby 3,4-dichlorophenol can be chlorinated to obtain a mixture of polychlorophenols that is rich in 2,4,5-trichlorophenol and can be used directly for the production of effective herbicides. Ways are known whereby the starting compound 3,4-dichlorophenol can be produced in quantity at a moderate cost.

Groves et al., J. C. S. 514 and 523 (1929), teach that 2,3,4-trichlorophenol is the chief product when 3,4-dichlorophenol is monochlorinated. They carried out the chlorination by passing chlorine into a cooled solution of the 3,4-dichlorophenol and sodium acetate in glacial acetic acid.

It has now been found that a mixture of polychlorophenols, mainly trichlorophenols, containing 2,4,5-trichlorophenol as the principal ingredient can be formed by chlorinating 3,4-dichlorophenol in the presence of a metal chloride, e. g. iron chloride or aluminum chloride, as a chlorination catalyst. It has further been found that such metal halide catalysts need not be added as such, but may be formed in effective amount in situ, e. g. by carrying the chlorination out in a vessel containing, or comprising inner surfaces of, iron or aluminum. In other words, metallic iron, metallic aluminum, or a chloride of either of said metals, or mixtures of the metals or their chlorides, can be used as the catalyst, the actual catalysts probably being the metal chlorides.

The chlorination is carried out by passing chlorine into a mixture comprising the 3,4-dichlorophenol and one or more of the above-mentioned catalysts. Hydrogen chloride is usually vented from the reaction vessel as it is formed. The 3,4-dichlorophenol is preferably employed directly in undiluted form, but the reaction mixture may comprise liquid diluents such as carbon tetrachloride, or tetrachloroethylene, etc. Such diluents do not interfere with the reaction for formation of the 2,4,5-trichlorophenol, but their presence is not required. The catalyst need be present only in very small proportion, but it can be used in as large amount as desired. The reacted mixtures usually contain less than one weight per cent of dissolved metal chloride, e. g. iron chloride or aluminum chloride, and considerably smaller proportions of such compounds are sufficient to catalyze the reaction.

The chlorination reaction can be carried out at any temperature between the freezing point and boiling point of the reaction mixture, but is usually conducted at temperatures between 15° and 150° C., and preferably between 75° and 130° C. At temperatures within a range of from 25° to 130° C., changes in the reaction temperature effect the reaction rate, but appear to have little, if any, effect on the proportion of 2,4,5-trichlorophenol in the mixture of isomeric trichlorophenols which is formed.

The chlorination is usually continued to a point at which the increase in weight, or in density, of the mixture corresponds approximately to the formation of trichlorophenols. The reacted mixture may be distilled to separate the mixture of isomeric trichlorophenols from lower or higher boiling ingredients. The isomeric trichlorophenols which are formed consist principally, if not entirely, of 2,3,4-trichlorophenol and 2,4,5-trichlorophenol, the latter being in greatest amount.

The following examples describe certain ways in which the invention has been practiced, but are not to be construed as limiting its scope.

EXAMPLE 1

A small piece of iron, having 0.25 square inch of surface area, was immersed in a solution of 11 grams of 3,4-dichlorophenol and 10 cc. of tetrachloroethylene. Chlorine was passed into the mixture for 90 minutes while maintaining the mixture at 25° C. and venting hydrogen chloride from the reaction vessel as it was formed. The mixture then analyzed to determine the kinds and relative proportions of chlorophenols therein. The chlorinated phenols present in the product consisted of approximately 50 weight per cent of 2,4,5-trichlorophenol, 43 per cent of 2,3,4-trichlorophenol, and 7 per cent of unconsumed 3,4-dichlorophenol.

EXAMPLE 2

In each of a series of experiments, chlorine was passed into 3,4-dichlorophenol while maintaining the latter in contact with iron and at the temperatures indicated in the following table and venting hydrogen chloride from the reaction vessel. Each chlorination was continued until the reaction mixture had increased in weight to an extent corresponding approximately to the formation of trichlorophenol. Each reacted mixture was analyzed to determine the kinds and relative proportions of chlorinated phenols therein. The table gives the weight of 3,4-dichlorophenol used in each experiment, the increase in weight of the mixture during the chlorination, the time and temperature for each chlorination reaction, and the weight per cent composition of the chlorinated phenols in the product.

Table

| Run No. | 3,4-dichlorophenol, gms. | Wt. Increase of Mixture, gms. | Reaction Conditions | | Composition of Product | | | |
|---|---|---|---|---|---|---|---|---|
| | | | Time, min. | Temp., °C. | 3,4-dichlorophenol, percent | 2,3,4-trichlorophenol, percent | 2,4,5-trichlorophenol, percent | 2,3,4,6-tetrachlorophenol, percent |
| 1 | 9.7 | 2.1 | 95 | 42-65 | 11 | 42 | 47 | --- |
| 2 | 50.0 | 10.4 | 120 | 75 | 2 | 46 | 52 | --- |
| 3 | 100.6 | 21.3 | 133 | 76-79 | --- | 46 | 52 | 2 |
| 4 | 5.0 | 1.05 | 28 | 125-130 | --- | 44 | 56 | --- |

EXAMPLE 3

Gaseous chlorine was passed into a mixture of 10.1 grams of 3,4-dichlorophenol and 0.1 gram of ferric chloride for 1 hour while heating the mixture at temperatures of from 67° to 70° C. in a glass reaction vessel and venting hydrogen chloride from the mixture as it was formed. When the introduction of chlorine was discontinued the mixture in the flsk weighed 12.6 grams, i. e. there was an increase in weight of 2.4 grams due to the introduction of chlorine. The reacted mixture was analyzed to determine the kinds and relative proportions of chlorinated phenols present. The chlorinated phenols in the product consisted of approximately 47 weight per cent of 2,4,5-trichlorophenol, 38 per cent of 2,3,4-trichlorophenol, and 15 per cent of 2,3,4,6-tetrachlorophenol.

EXAMPLE 4

Gaseous chlorine was passed into a mixture of 10.1 grams of 3,4-dichlorophenol and 0.1 gram of aluminum chloride for about 1 hour while heating the mixture in a glass reaction vessel at temperatures of from 67° to 74° C. and venting the hydrogen chloride as it was formed. The reacted mixture remaining in the reaction vessel weighed 12.4 grams, i. e. 2.2 grams more than at the start of the reaction. It was analyzed to determine the kinds and relative proportions of chlorinated phenols present. The chlorinated phenols in the product consisted of approximately 50 weight per cent of 2,4,5-trichlorophenol, 44 per cent of 2,3,4-trichlorophenol, 3 per cent of 2,3,4,6-tetrachlorophenol, and 3 per cent of unreacted 3,4-dichlorophenol.

I claim:

1. A method of making a mixture of polychlorophenols that is rich in 2,4,5-trichlorophenol and contains the latter as the principal trichlorophenol ingredient, which method comprises reacting approximately one molecular equivalent of chlorine with one mole of 3,4-dichlorophenol in the presence of at least one catalyst of the group consisting of iron, aluminum, iron chloride and aluminum chloride.

2. A method of making a mixture of isomeric trichlorophenols, that is rich in 2,4,5-trichlorophenol and contains the latter as the principal trichlorophenol ingredient, which method comprises passing chlorine into 3,4-dichlorophenol, while contacting the latter with iron and maintaining the mixture at reaction temperatures between 15° and 150° C. until the mixture has increased in weight by an amount corresponding approximately to the formation of trichlorophenols.

References Cited in the file of this patent
UNITED STATES PATENTS

| 2,131,259 | Stoesser | Sept. 27, 1938 |
| 2,440,602 | Foster | Apr. 27, 1948 |

OTHER REFERENCES

Holleman: Chem. Abstracts, vol. 12 (1918), pp. 1542-3.

Groves et al.: Jour. Chem. Soc. (London), pp. 514 and 523 (1929).

Richter: "The Chemistry of the Carbon Compounds," vol. III, The Aromatic Compounds (Translated by Mee), p. 197; Elsevier Pub. Co., New York (1946).